United States Patent [19]

Ettischer et al.

[11] 3,782,260

[45] Jan. 1, 1974

[54] PHOTOGRAPHIC CAMERA WITH INTERCHANGEABLE LENSES AND BAYONET LOCK

[75] Inventors: Helmut Ettischer; Dietmar Blattner, both of Schwaikheim; Wolfgang Ort, Stuttgart-Wangen, all of Germany

[73] Assignee: Eastman Kodak Company, Rochester, N.Y.

[22] Filed: July 14, 1972

[21] Appl. No.: 271,846

[52] U.S. Cl.................................. 95/45, 95/64 R
[51] Int. Cl............................................ G03b 7/14
[58] Field of Search...................... 95/42, 45, 64 R, 95/64 B

[56] References Cited
UNITED STATES PATENTS

| | | | |
|---|---|---|---|
| 3,052,171 | 9/1962 | Mahn | 95/45 X |
| 2,925,765 | 2/1960 | Gebele | 95/45 X |
| 2,997,935 | 8/1961 | Scheffold | 95/45 |
| 3,012,491 | 12/1961 | Malek | 95/45 |
| 3,608,450 | 9/1971 | Shimomura | 95/42 X |

*Primary Examiner*—Samuel S. Matthews
*Assistant Examiner*—E. M. Bero
*Attorney*—W. H. J. Kline et al.

[57] ABSTRACT

A mechanism for mounting interchangeable lens units on photographic apparatus includes a coupling member movable under urging of an adjusting ring to unlock a spring loaded bayonet lock and thereby permit insertion of a lens unit. Means may also be provided for transmitting movement of the adjusting ring to an adjustable diaphragm associated with the lens unit.

13 Claims, 2 Drawing Figures

PATENTED JAN 1 1974 3,782,260

PHOTOGRAPHIC CAMERA WITH INTERCHANGEABLE LENSES AND BAYONET LOCK

BACKGROUND OF THE INVENTION

1. Field of the Invention

This invention relates generally to photographic apparatus adapted to receive interchangeable lens units, and more particularly to such apparatus having diaphragm adjusting means.

2. Description of the Prior Art

Many cameras are known which are designed for use with interchangeable lenses having different focal lengths, to permit picture taking under a wide variety of scene conditions. The commercial acceptance of such cameras has been determined, in part, by the speed and ease with which the individual lens units could be fitted and locked into position. However, the design and construction of such cameras must provide for the prevention of light leakage around the lens units as well as insuring that the lens unit is securely locked to the camera. Thus, the resultant connecting mechanism has usually been relatively complex and costly.

Cameras for use with interchangeable lens units also required means for changing the effective aperture since the relative aperture will be dependent upon the focal length of the different lens units. Designs are known in which a diaphragm and the diaphragm adjusting means are both included within the camera, are both included within the individual lens units, or are divided between the camera and lens units. The first design is the least costly but requires a relatively skilled operator who can adjust the camera diaphragm to achieve the proper relative aperture for each focal length lens. The second design increases the cost of the individual lens unit but minimizes the skill required of the operator in setting the aperture. The third design results in lens units of intermediate cost and also minimizes the skill required of the operator. Each design must insure accurate aperture settings and, in addition, the second and third designs must be easily and quickly disengaged when the lens unit is removed from the camera.

SUMMARY OF THE INVENTION

An object of this invention is, accordingly, to provide an improved mechanism for interconnecting a camera with interchangeable lens units.

Another object is to provide such a mechanism which is inexpensive and simple to operate.

Still another object is to provide a camera which incorporates such a simple and inexpensive mechanism.

A still further object is to provide such a mechanism which is also adapted to interconnect an adjustable diaphragm in each lens unit with a diaphragm adjusting member on the camera.

These and other objects are accomplished according to this invention by means of a pin coupled to an adjusting member of the camera, the adjusting member being movable within an operating range to preset a parameter such as aperture, range and such like. Movement of the adjusting member past the end of its operating range causes the pin to urge a bayonet lock on the camera to an open position, thereby permitting the lens unit to be inserted into the camera. Upon movement of the adjusting member back to a position within its operating range, the bayonet lock is spring urged to a locking position in which the lens unit is securely locked to the camera.

In a preferred embodiment, the pin is coupled to the diaphragm adjusting ring of the camera and the ring is also provided with a lug which engages a mating arm on the interchangeable lens unit. Movement of the camera diaphragm adjusting ring within its operating range is transmitted through the lug and mating arm to an adjustable diaphragm associated with the interchangeable lens.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Because photographic cameras are well known, the present description will be directed in particular to elements forming part of, or cooperating more directly with, the present invention. Camera elements not specifically shown or described herein are understood to be selectable from those known in the art.

Figure 1:
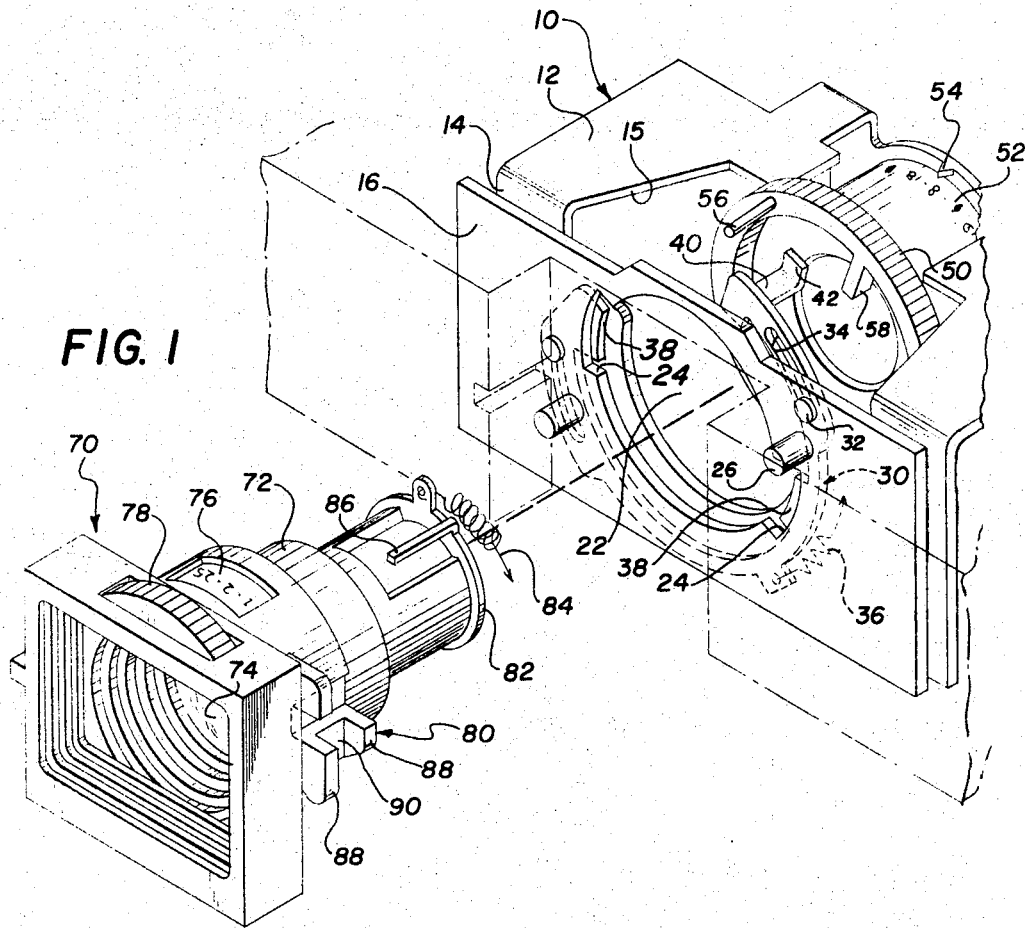
FIG. 1 is a perspective view of a portion of a camera incorporating the improved mechanism of this invention, with an interchangeable lens unit in position to be interconnected with the camera.
Figure 2:
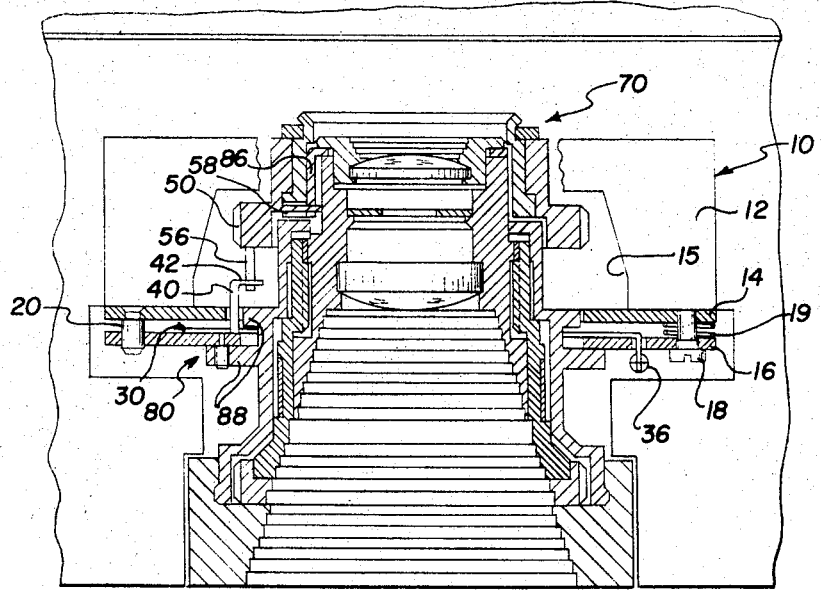
FIG. 2 is a cross-sectional view of such a camera with a lens unit interconnected with it.

Referring now to FIG. 1, a support member 10 is mounted within a camera housing shown in phantom. Support member 10 includes an upper support plate 12 and a forward downwardly depending wall 14; plate 12 and wall 14 defining a central opening 15 through which a lens unit may be inserted. A front mounting plate 16 is mounted on and spaced apart from wall 14 by means of screws 18, springs 19 and locating pins 20 spaced around the periphery of plate 16. Plate 16 defines a central opening 22 which is axially aligned with opening 15 in support member 10 and through which a lens unit may be inserted. Plate 16 further defines a pair of locking recesses 24, extending outwardly from opening 22 and a pair of mounting pins 26.

A bayonet ring shown generally as 30 is movably mounted between plate 16 and wall 14 by means of pins 32, fixed to plate 16, which extend through slots 34 in bayonet ring 30. Bayonet ring 30 is biased in a counterclockwise direction by a spring 36. Bayonet ring 30 further has a pair of locking lugs 38 and an inwardly extending arm 40 which terminates in an upwardly extending ear 42. When in its counterclockwise position as illustrated in FIG. 1, lugs 38 on bayonet ring 30 are in a locking position, aligned with recesses 24. When ring 30 is moved in a clockwise direction, lugs 38 will be moved away from their locking position permitting insertion of a lens unit.

Diaphragm setting for the camera illustrated in FIG. 1 is obtained by a diaphragm adjusting ring 50 which is co-mounted and rotatably movable along with a diaphragm scale 52, visible externally of the camera. A stationary mark 54 is positioned on support member 10 in proximity with scale 52 to permit the operator to set the desired aperture. The diaphragm may be located within the camera or, as in the preferred emodiment of this invention, may be located within the lens unit. The mechanism for setting the desired aperture is not illustrated but may be selected from any of those which are well known in the art. Diaphragm ring 50 has fixedly mounted on it an engaging pin 56 which extends in a forwardly direction and which may be brought into contact with ear 42 on bayonet ring 30. Diaphragm ring 50 further may have fixedly mounted on it an engaging lug 58 which extends inwardly.

When diaphragm ring 50 is rotated in a counterclockwise direction, pin 56 will be moved out of contact with ear 42, bayonet ring 30 remaining in its counterclockwise position under the urging of spring 36. Thus, the operator may rotate ring 50 to any desired aperture setting within its operating range. However, as diaphragm ring 50 is rotated in a clockwise direction, pin 56 will come into contact with ear 42 as ring 50 passes the smallest aperture setting of the camera. Further movement of ring 50 will cause bayonet ring 30 to be urged in a clockwise direction by the engagement of pin 56 with ear 42, against the bias of spring 36. Thus, movement of diaphragm ring 50 past the smallest aperture setting unlocks bayonet ring 30 and conversely movement of the diaphragm ring 50 to within its operating range permits bayonet ring 30 to move to its locking position. It should be noted that coupling of bayonet ring 30 to the diaphragm ring 50 as ring 50 moves past the smallest aperture setting is not essential to this invention. Ring 50 could easily be adapted to be moving past the largest aperture setting when it comes into engagement with the bayonet ring 30. Alternatively, bayonet ring 30 could be coupled to a different adjusting member of the camera, such as a range ring, which could then move bayonet ring 30 to its unlocking position as the adjusting member is moved outside of its operating range.

A preferred embodiment of a lens unit adapted for mounting with a camera according to this invention is shown generally as 70. Lens unit 70 consists of a lens housing 72; a lens 74; a range scale 76; a range setting ring 78; a pair of locking members projecting from housing 72, one of which is shown at 80 and the other of which is located on the opposite side of lens housing 72 from member 80; and a diaphragm setting member 82. Diaphragm setting member 82 is biased in a clockwise direction by a spring 84 and has an integrally formed arm 86 which is engageable by lug 58 when lens unit 70 is properly mounted on the camera. Diaphragm adjusting member 82 is further adapted to control a diaphragm associated with lens unit 70 in any manner which is well known in the art. Locking members 80 each consist of a pair of outwardly extending spaced apart walls 88; each pair of walls 88 defining thereby a locking slot 90.

To mount lens unit 70 in the camera as illustrated in FIG. 1, diaphragm ring 50 is rotated in a clockwise direction past the smallest aperture setting on scale 52. Pin 56 will urge bayonet ring 30 in a clockwise direction against the bias of spring 36, under engagement of pin 56 with ear 43. Lugs 38 on bayonet ring 30 will be moved away from their locking position in which they are aligned with locking recesses 24. Lens unit 70 may now be inserted through openings 15 and 22 into the interior of the camera. Mounting pins 26 will engage mating holes in lens unit 70, so that the operating elements of lens unit 70 will be in proper alignment with the operating elements of the camera. Locking members 80 will simultaneously pass into recesses 24 and slots 90 will now be positioned in the path of travel of locking lugs 38.

To lock lens unit 70 onto the camera, the operator rotates diaphragm ring 50 in a counterclockwise direction. Diaphragm ring 50 moves back to within its operating range, freeing pin 56 from engagement with lug 42. Simultaneously, bayonet ring 30 moves in a counterclockwise direction under urging of spring 36, bringing lugs 38 through slots 90 to securely lock the lens unit onto the camera. To remove lens unit 70 from the camera, the operator rotates diaphragm ring 50 in a clockwise direction, thereby urging bayonet ring 30 to its unlocked position and removing lugs 38 from slots 90 on lens unit 70. Lens unit 70 may now be removed from the camera by moving it in a forward direction.

In a preferred embodiment of this invention, movement of diaphragm ring 50 from its unlocking position brings lug 58 into engagement with arm 86 of diaphragm setting member 82.

When the operator desires to change the aperture setting of the camera, he merely rotates diaphragm adjusting ring 50 to the desired aperture setting on scale 52. Movement of ring 50 is transmitted by means of engagement of lug 58 with arm 86 to diaphragm setting member 82 which moves against the bias of spring 84. The camera is now ready for picture taking operation. When diaphragm ring 50 is rotated to its unlocking position, lug 58 is simultaneously moved out of engagement with arm 86, freeing lens unit 70 for removal from the camera.

This invention has been described in detail with particular reference to the preferred embodiment thereof but it will be understood that variations and modifications can be effected within the spirit and scope of the invention. We claim:

1. For use in photographic apparatus adapted for receiving an interchangeable lens unit, a mechanism for interconnecting such an interchangeable lens unit with such apparatus, said mechanism comprising:

means for locking such an interchangeable lens unit in operational relationship with such apparatus, said locking means including a locking member movable between a locking position and an unlocking position;

means movable within a first range for adjusting operation of such apparatus and further movable within a second range for operating said locking means; and means interconnecting said adjusting and operating means and said locking means for moving said locking member to said unlocking position in response to movement of said adjusting and operating means to a predetermined position within said second range.

2. A mechanism as in claim 1 wherein said locking member is a bayonet ring and said locking means further includes resilient means for biasing said bayonet ring toward said locking position.

3. A mechanism as in claim 2 wherein said interconnecting means further includes a pin engageable with said bayonet ring to move said bayonet ring to said unlocking position in response to movement of said adjusting and operating means to said predetermined position.

4. A mechanism as in claim 1 for use with a lens unit of the type which has an adjustable diaphragm associated therewith, wherein said interconnecting means further includes means for coupling said adjusting and operating means of said mechanism with such an adjustable diaphragm associated with a received lens unit to move such an adjustable diaphragm within a predetermined operating range in response to movement of said adjusting and operating means within said first range.

5. A camera adapted for receiving an interchangeable lens unit, said camera comprising:
  means for locking such an interchangeable lens unit in a predetermined orientation with respect to said camera, said locking means including a locking member movable between a locking position and an unlocking position;
  means movable within a first range for adjusting operation of said camera and further movable within a second range for operating said locking means; and
  means interconnecting said adjusting and operating means and said locking means for moving said locking member to said unlocking position in response to movement of said adjusting and operating means to a predetermined position within said second range.

6. A camera as in claim 5 wherein said locking member is a bayonet ring and said interconnecting means further includes resilient means for biasing said bayonet ring toward said locking position.

7. A camera as in claim 6 wherein said interconnecting means further includes a pin engageable with said bayonet ring to move said bayonet ring to said unlocking position in response to movement of said adjusting and operating means to said predetermined position.

8. A camera as in claim 5 for use with a lens unit of the type which has an adjustable diaphragm associated therewith, wherein said interconnecting means further includes means for coupling said adjusting and operating means with such an adjustable diaphragm on a received unit to move such an adjustable diaphragm within a predetermined operating range in response to movement of said adjusting and operating means within said first range.

9. In a camera and interchangeable lens unit combination, the camera including an exposure adjusting element movable within a first exposure adjusting range and further movable to a predetermined position within a second range, and the lens unit including means for positioning the lens unit in operational relationship with such a camera, the improvement comprising:
  means for interconnecting said adjusting element with said positioning means, said interconnecting means being movable to an unlocking position in response to movement of said adjusting element to said predetermined position within said second range, and said interconnecting means being movable to a locking position to lock said lens unit to said camera in response to movement of said adjusting element to within its first exposure adjusting range.

10. The improvement according to claim 9 wherein said positioning means defines a locking slot and said interconnecting means includes a bayonet ring positionable within said locking slot when said lens unit is in operable relationship with said camera and said adjusting element is within its first exposure adjusting range.

11. The improvement according to claim 10 wherein said interconnecting means further includes a pin engageable with said bayonet ring to move said ring to an unlocking position in response to movement of said adjusting element to said predetermined position.

12. The improvement according to claim 9 wherein said adjusting element is operable to set a diaphragm value and wherein said lens unit includes an adjustable diaphragm, said interconnecting means further including means for coupling movement of said adjusting element within its first exposure adjusting range to said adjustable diaphragm.

13. A camera adapted for receiving an interchangeable lens unit of the type having an adjustable diaphragm associated therewith, said camera comprising:
  means for locking such an interchangeable lens unit in a predetermined orientation with respect to said camera, said means including a bayonet ring movable between a locking position and an unlocking position;
  means movable within a first range for setting a diaphragm value and further being movable within a second range to a predetermined position for operating said locking means;
  means interconnecting said setting and operating means and said locking means for moving said bayonet ring to said unlocking position in response to movement of said setting and operating means to said predetermined position within said second range; and
  means coupling said setting and operating means with the adjustable diaphragm of a received unit for adjusting such a diaphragm in response to movement of said setting and operating means within said first range.

* * * * *